(12) United States Patent  
Ellison

(10) Patent No.: US 7,779,752 B1
(45) Date of Patent: Aug. 24, 2010

(54) FOOD ITEM PITTING OR CORING AND STUFFING DEVICE

(76) Inventor: Thomas E. Ellison, 1101 N. Main St., Los Angeles, CA (US) 90012

( * ) Notice: Subject to any disclaimer, the term of this patent is extended or adjusted under 35 U.S.C. 154(b) by 1240 days.

(21) Appl. No.: 11/321,359

(22) Filed: Dec. 28, 2005

Related U.S. Application Data

(60) Provisional application No. 60/639,477, filed on Dec. 28, 2004.

(51) Int. Cl.
*A23B 4/02* (2006.01)
(52) U.S. Cl. .............................. 99/494; 99/547; 99/553; 426/481; 426/485; 219/494
(58) Field of Classification Search ........... 99/537–563, 99/584–588, 494, 485–489; 426/481–485; 219/494
See application file for complete search history.

(56) References Cited

U.S. PATENT DOCUMENTS

| 2,644,569 A | 7/1953 | Francisco |
| 2,681,089 A | 6/1954 | Francisco |
| 3,772,982 A | 11/1973 | Smith |
| 3,962,474 A | 6/1976 | Smith |
| 4,096,795 A | 6/1978 | Del Ser Gonzalez |
| 4,102,257 A | 7/1978 | Gonzalez |
| 4,182,233 A | 1/1980 | del Ser Gonzalez |
| 4,248,903 A | 2/1981 | Margaroli et al. |
| 4,265,169 A | 5/1981 | Silvestrini |
| 4,308,292 A | 12/1981 | Silvestrini |
| 4,337,693 A | 7/1982 | Dandrea |
| 4,644,859 A | 2/1987 | Gutierrez Rubio et al. |
| 4,732,771 A * | 3/1988 | Bushman .................... 426/482 |
| 4,847,101 A | 7/1989 | Rubio |
| 4,871,568 A * | 10/1989 | Cimperman ................. 426/484 |
| 4,925,691 A * | 5/1990 | Cimperman ................. 426/485 |
| 2004/0009270 A1 | 1/2004 | Zeeper |

* cited by examiner

Primary Examiner—Mark H Paschall
(74) *Attorney, Agent, or Firm*—Christie, Parker & Hale, LLP

(57) ABSTRACT

A method and apparatus for pitting and stuffing food items include a processing tool that may pit any type of fruit of vegetable product. The same processing tool then stuffs the fruit or vegetable with another food item. The processing tool may include two sets of opposed knife assemblies that work in combination to remove a core of the first food item by cutting into the food item from one side to push the core toward the other knife. The second knife assembly defines and cuts the interior space of the first food item. The core may be retracted by the second knife assembly or completely pushed out by the first knife assembly. The second food item is loaded into the second knife assembly and then pushed into the space created in the first food item by a piston within the second knife assembly.

20 Claims, 15 Drawing Sheets

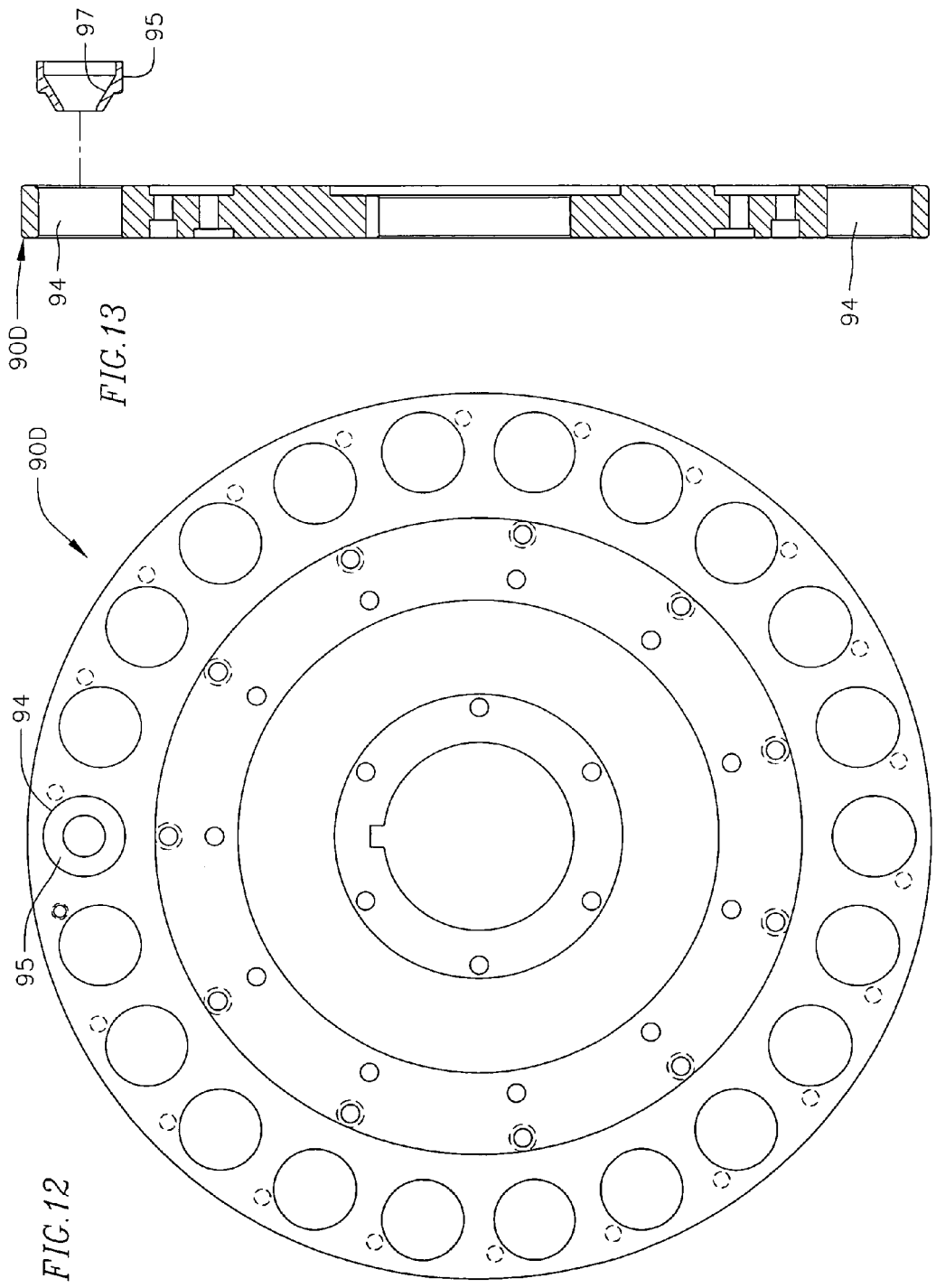

FOOD ITEM PITTING OR CORING AND STUFFING DEVICE

CROSS-REFERENCE TO RELATED APPLICATION

This application claims the benefit of U.S. Provisional Patent Application No. 60/639,477, filed Dec. 28, 2004, the entire content of which is incorporated herein by reference.

FIELD OF THE INVENTION

The present invention relates generally to a food item pitting and stuffing device and particularly to an automated device for removing a pit from or otherwise coring a food item, thereby creating a cavity in the food item, and stuffing the cavity with a stuffing product.

BACKGROUND

Many popular foods are created by pitting and coring a first food item such as a fruit or vegetable to allow for the stuffing of other food items including fruits and vegetables into the first food item. Olives, peppers and similar fruits and vegetables are commonly pitted, cored or similarly hollowed out and then stuffed with other fruits and vegetables, dairy products like cheese, meat and poultry items and similar foodstuffs. Traditionally, this process has been entirely manual. However, as food producers seek to increase the speed at which these foods are produced while reducing the cost of producing these items the process has become increasingly automated. Many automated devices are in common use for pitting, coring or hollowing out food items, but stuffing of such food items remains a manual process. One example food that is often pitted and stuffed is the olive. Olives are often stuffed with pimentos, anchovies, almonds, garlic, jalapeños and similar foodstuffs.

A process and machine has been developed to insert gelatin strips into olives, this specialized method and device is unable to insert foodstuffs in other forms or operate on items other than olives. This device utilizes a separate insertion tool from the pitting tools in the machine to insert the gelatin strips and results in folded gelatin strip placed within the olive that does not completely fill the interior space of the olive. As a result, a labor intensive, manual procedure must be utilized to insert other types of foodstuffs, which is more expensive.

SUMMARY

A food processing apparatus includes a first knife assembly to define a space in a first food item, the first knife assembly to insert a second food item into the first food item and a second knife assembly to push a cut portion of the first food item toward the second knife assembly and a hollow knife to receive the cut portion of the first food item. The first knife assembly may also include a piston to press the second food item into the first food item. The cut portion of the first food item may be a core of the first food item and the second food item may be in a pumpable form. A delivery assembly may pump the second food item through a manifold to be captured by the first knife assembly.

An automated food processing method including inserting a first knife of a processing tool into a first food item, inserting a second knife of the processing tool into the first food item, to define a space in the first food item, pushing a core of the first food item toward the second knife with the first knife to remove the core from the first food item, and inserting a second food item into the space in the first food item through the second knife. The method may further include loading the first food item onto a conveyance mechanism, securing the first food item from the conveyance mechanism using the first knife and a surface of the processing tool, pushing the core into a hollow interior of the second knife or out of the first food item, retracting the second knife to remove the core from the first food item, pressing the second food item into a hollow interior of the second knife, advancing a piston through a hollow interior of the second knife to push the second food item into the first food item, pumping the second food item through a manifold, and orienting the first food item on a conveyance prior to coring.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

FIG. 12 is a front view of a centering plate for attachment to the rotating drum of the pitting and stuffing assembly of FIG. 10;

FIG. 13 is a side cross sectional view of the centering plate of FIG. 12;

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

As shown in FIGS. 1-20, embodiments of the present invention are directed to a food item pitting or coring and stuffing device 10, which removes a pit from or otherwise cores a food item, such as an olive, and stuffs the food item with whole pieces of a fresh fruit product, such as a pimento, a vegetable product, a puree, a gelatin, a cheese product, or another stuffing product suitable for the food item being stuffed and of a suitable viscosity for use with the food item pitting and stuffing device 10 of the present invention.

In the embodiments described below, although a pitting apparatus and process are described for pitting a food item, the process and apparatus may be used to core food items that do not include a pit (such as pickles, peppers, or fruit as well as other appropriate food items that may be cored) to create a cavity therein into which a stuffing product is stuffed. As such, the terms pitting and coring may be interchangeably used in the description below.

Figure 1:
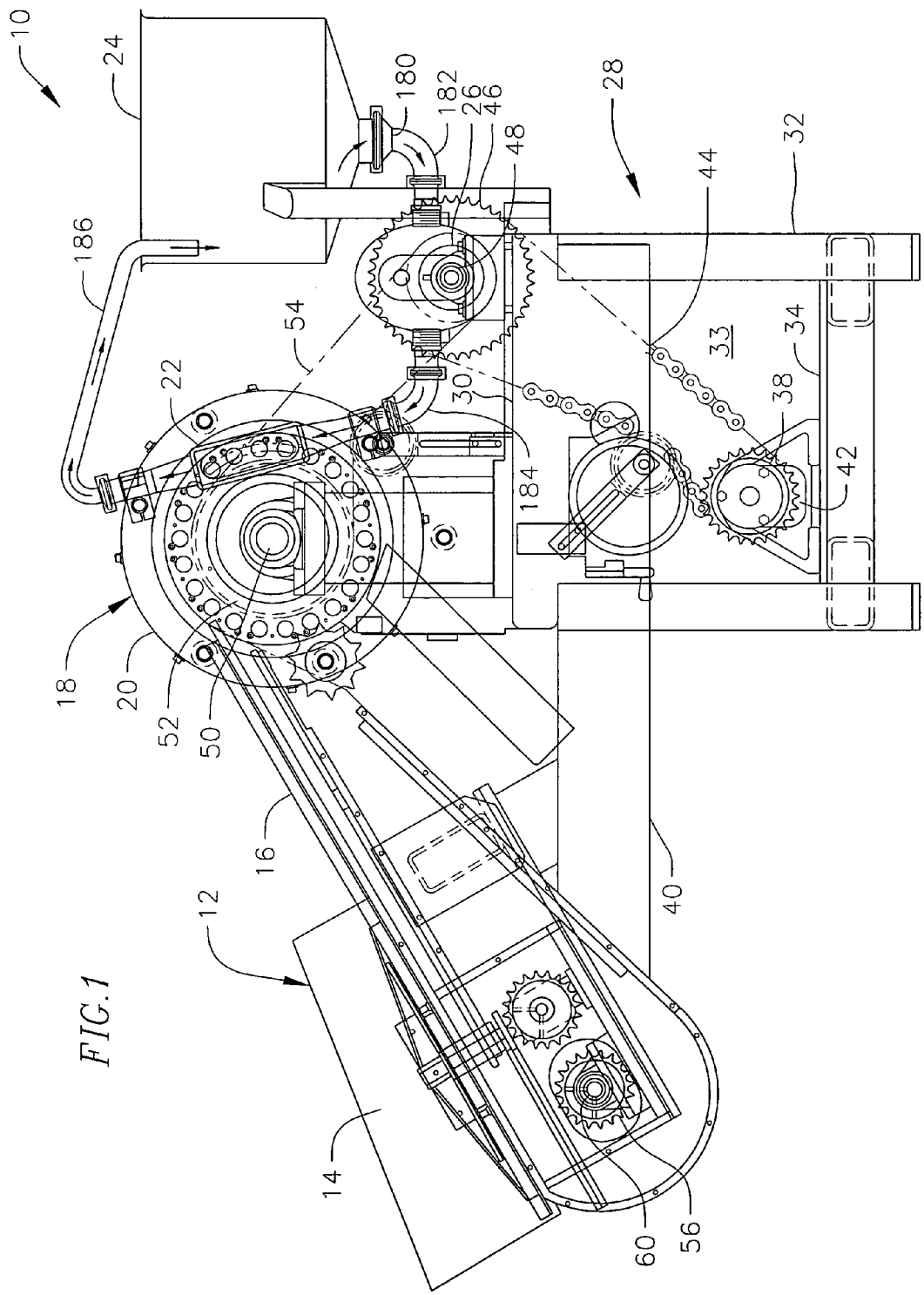
FIG. 1 is a side view of a pitting and stuffing device according to one embodiment of the present invention.

FIG. 1 shows one embodiment of the food item pitting and stuffing device 10. A brief overview of the pitting and stuffing device 10, as well as the pitting and stuffing process that it performs, is described below with respect to FIG. 1, followed by a more detailed discussion of the device and the process. As shown in FIG. 1, the pitting and stuffing device 10 includes a food item feeder assembly 12 having a feeder bowl 14 for receiving a plurality of food items (not shown), such as a plurality of olives. The feeder bowl 14 separates the food items and individually feeds them onto a conveyer chain 16. The conveyer chain 16 individually transports each food item from the feeder bowl 14 to a pitting and stuffing assembly 18.

The pitting and stuffing assembly 18 includes a rotating drum 20 having a knife assembly (not shown) moveably disposed therein. The knife assembly transports each food item from the conveyer chain 16 to a centering bushing (not shown) disposed within the rotating drum 20. In one embodiment, the centering bushing holds the food item and centers the food item with respect to the knife assembly as the food item rotates with the rotating drum 20. As the food item rotates with the rotating drum 20, the knife assembly is moved into contact with the food item to: remove or "pit" a pit from the food item; transport the pit into a pit container; pull a stuffing product (not shown), such as a fruit product, from a stuffing manifold 22; stuff the food item with the stuffing product; and transport the pitted and stuffed food item from the centering bushing to a food item container.

As shown, the stuffing manifold 22 is disposed in close relation to a portion of the circular path of the centering bushing and the knife assembly of the rotating drum 20. The stuffing manifold 22 is connected to a stuffing tank 24 which holds a large quantity of stuffing product. A stuffing pump 26, such as a positive displacement pump, continuously feeds stuffing product from the stuffing tank 24 to the stuffing manifold 22 providing the knife assembly with stuffing product to be stuffed into the food items.

Figure 2:
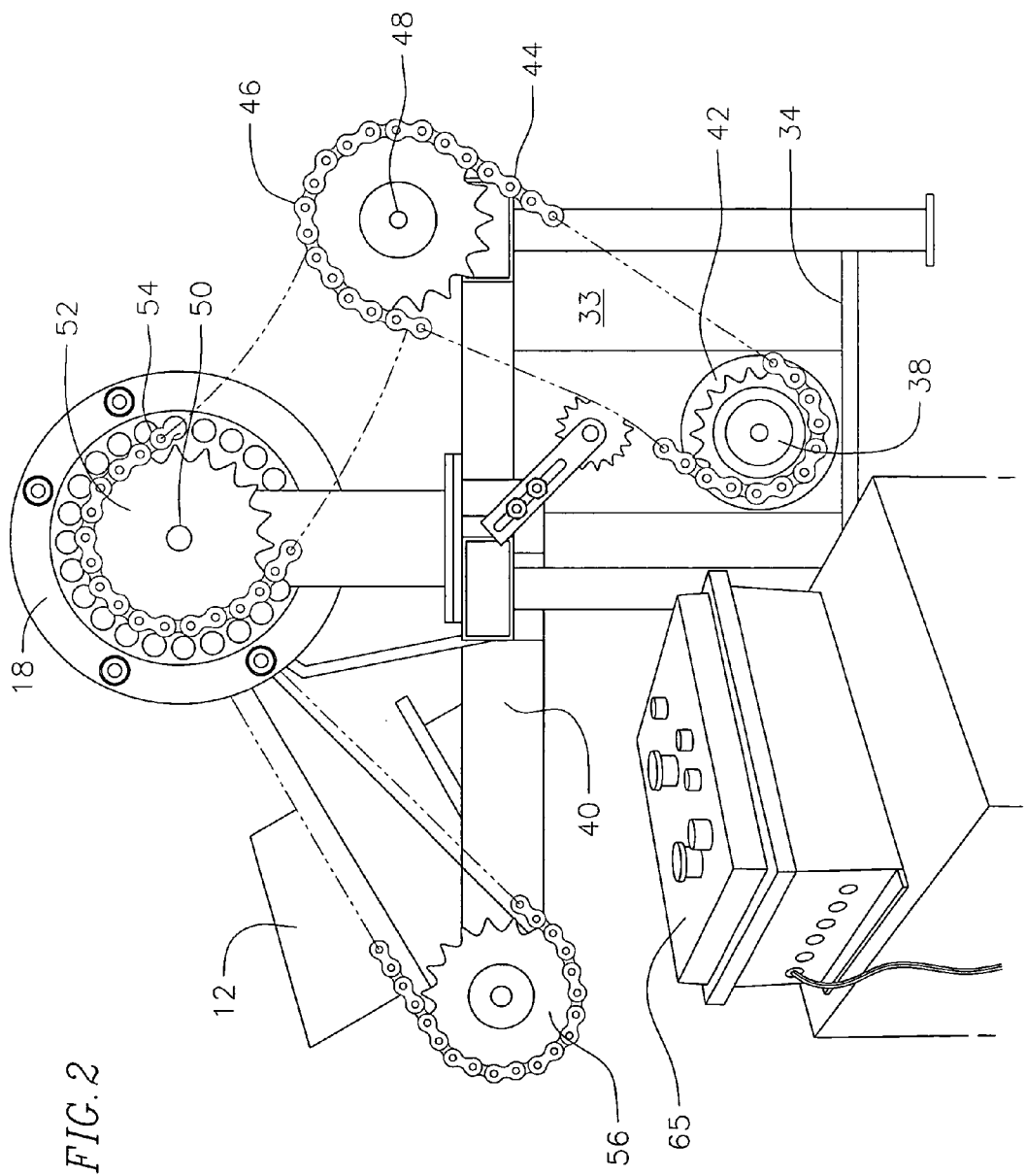
FIG. 2 is another side view of a pitting and stuffing device of FIG. 1.

As shown in FIGS. 1 and 2, the feeder assembly 12, the pitting and stuffing assembly 18, the stuffing pump 26 (not shown in FIG. 2) and the stuffing tank 24, among other components of the pitting and stuffing device 10, are supported by a support table 28. The support includes a table 30 upon which the pitting and stuffing device 10, the stuffing tank 24 and the stuffing pump 26 are mounted and a plurality of legs 30 for contacting a ground surface. The support table 28 also includes a horizontally extending arm 40 upon which the feeder assembly 12 is mounted.

As is also shown in FIGS. 1 and 2, the support table 28 contains a cavity 33 having a lower table 34 upon which a motor 38, which serves to power and operate the pitting and stuffing device 10, is mounted. The motor 38 drives a motor drive sprocket 42, which may include a torque limiter. The motor drive sprocket 42 is connected via a chain 44 to a pump sprocket 46 which drives a drive shaft 48 of the stuffing pump 26. Also connected to the pump draft shaft 48, (not shown, but located between the pump sprocket 46 and the stuffing pump 26) is a second pump sprocket driven by the motor 38 through the pump draft shaft 48. The second pump sprocket is connected to a sprocket 52 of the of the pitting and stuffing assembly 18 via a chain 54 to drive a drive shaft 50 of the pitting and stuffing assembly 18. The drive shaft 50 of the pitting and stuffing assembly 18, in turn, drives a first conveyer chain sprocket (not shown, but disposed about the drive shaft 50 of the pitting and stuffing assembly 18.) The first conveyer chain 16 sprocket drives the conveyer chain 16 and a second conveyer chain sprocket 56. The second conveyor chain sprocket 56 is connected via a drive shaft 60 (see also FIG. 4) of a feeder dial plate 66 (as shown in FIGS. 3-6 and described below.)

Figure 4:
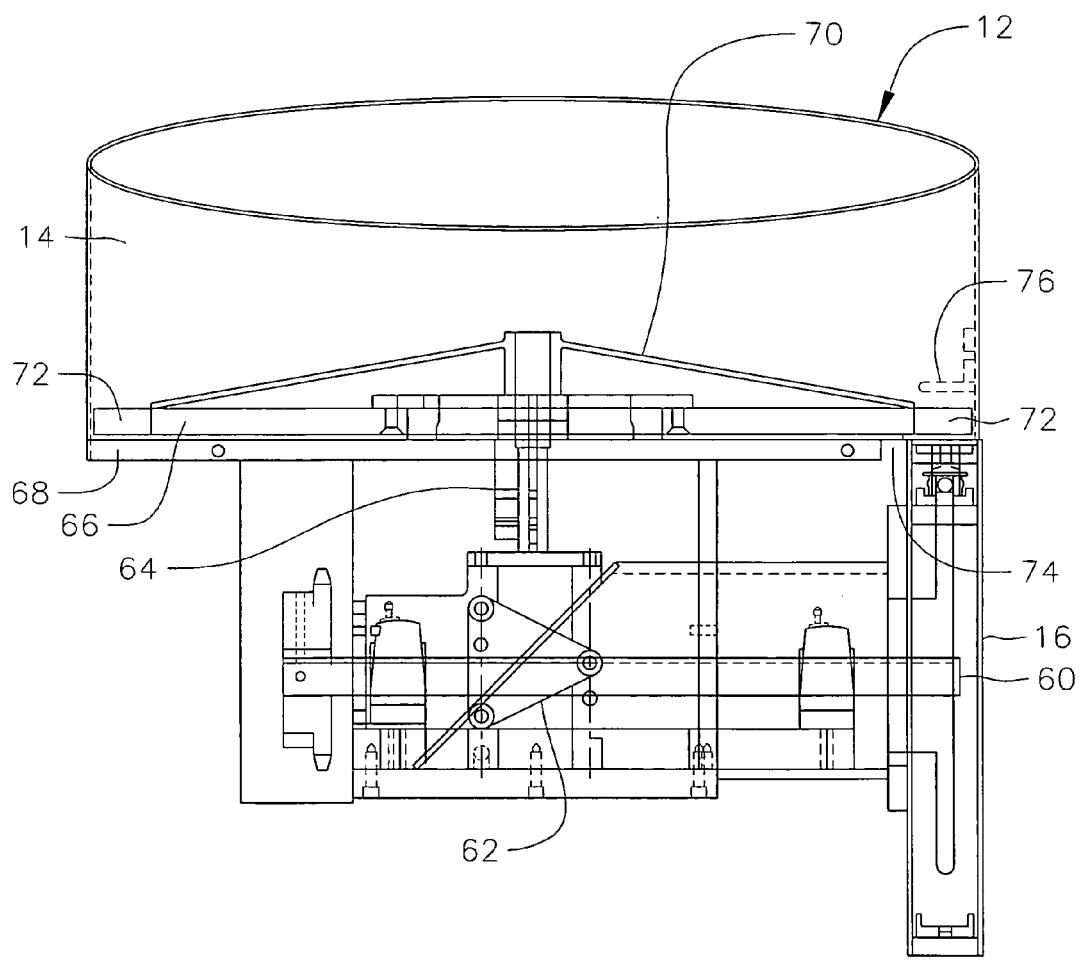
FIG. 4 is a side view of the feeder assembly of FIG. 3.

As is also shown in FIG. 4, the feeder dial plate drive shaft 60 drives the feeder dial plate 66 through a right angle drive 62 and a feeder dial drive adapter 64, which is connected directly the to feeder dial plate 66. As such, in one embodiment, the entire pitting and stuffing device 10 is powered by the same motor (motor 38 of FIG. 1.) FIG. 2 shows an electrical control box 65, which is electrically connected to the motor 38 and contains switches for activating and deactivating the motor 38.

FIGS. 3-6 show details of the feeder assembly 12. As shown, the feeder assembly 12 includes the feeder bowl 14 having a bottom plate 68 (see for example FIGS. 4 and 6) and an open top for receiving a plurality of food items to be pitted and stuffed. Directly adjacent to the bottom plate 68 is the feeder dial plate 66. The feeder dial plate 66 is a generally circular plate having a plurality of U-shaped openings 72 about its outer periphery. The U-shaped openings 72 are sized and shaped to receive a particular food item at a particular orientation. In this example, the U-shaped openings 72 are sized and shaped to receive a typical olive and to orient the longitudinal axis of the olive toward the edge or sidewall of the feeder bowl 14.

Figure 5:
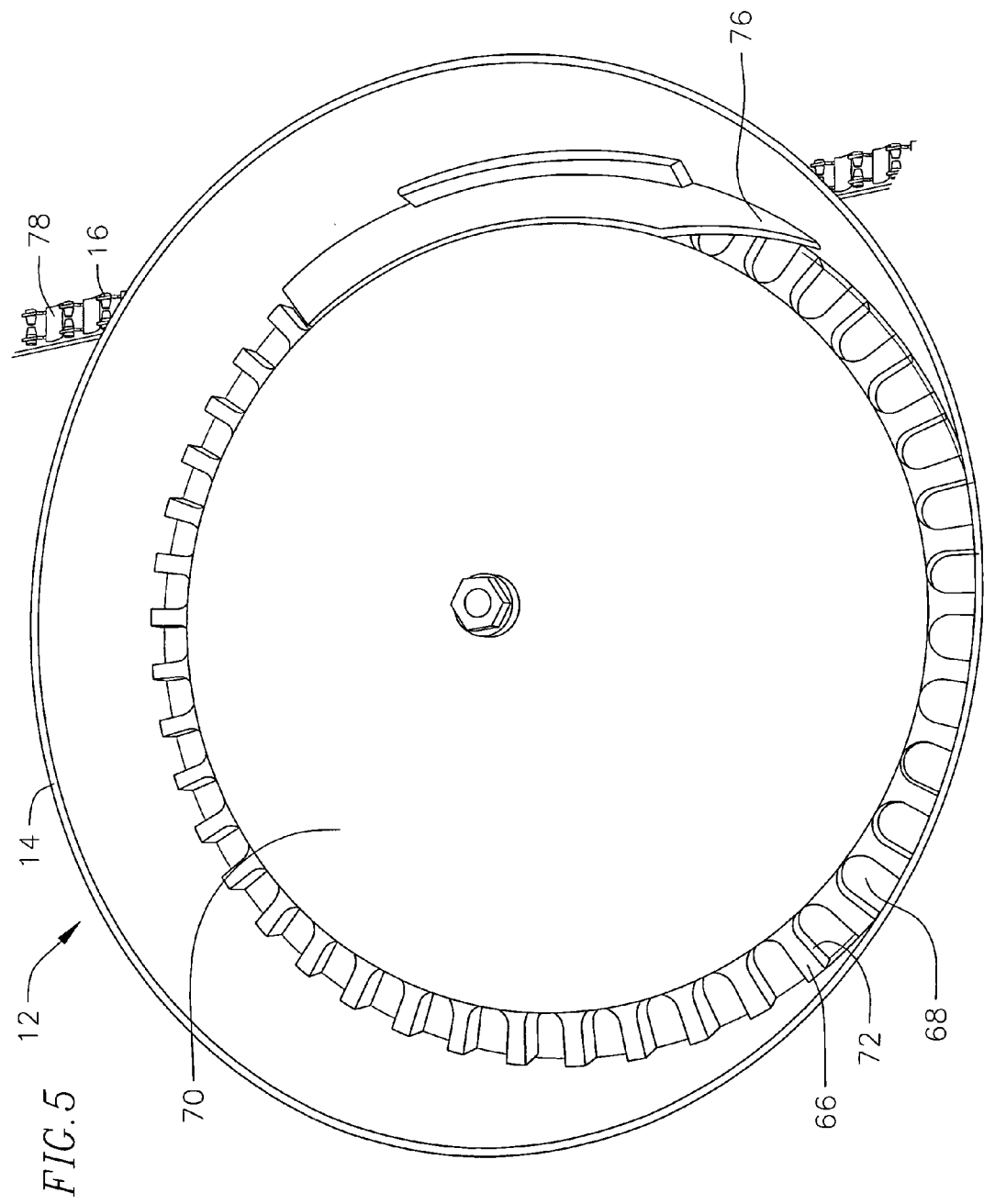
FIG. 5 is another top view of the feeder assembly of FIG. 3.

Directly adjacent to the feeder dial plate 66 is a center cone 70 (see for example FIGS. 4 and 5.) The center cone 70 includes a peak at the center of the feeder bowl 14 and tapers downwardly toward the outer circumference of the feeder bowl 14. The center cone 70 covers a center portion of the feeder dial plate 66, but does not cover the U-shaped openings 72 of the feeder dial plate 66. Thus, food items placed within the feeder bowl 14 are guided by the tapered sides of the center cone 70 to the U-shaped openings 72 of the feeder dial plate 66.

The feeder dial plate 66 is driven by the feeder dial plate shaft 60 (as described above) to rotate relative to the bottom plate 68. As the dial plate 66 rotates and the food items descend toward the periphery of the dial plate 66, the food items gradually fall into the U-shaped openings 72 of the dial plate 66.

Figure 3:
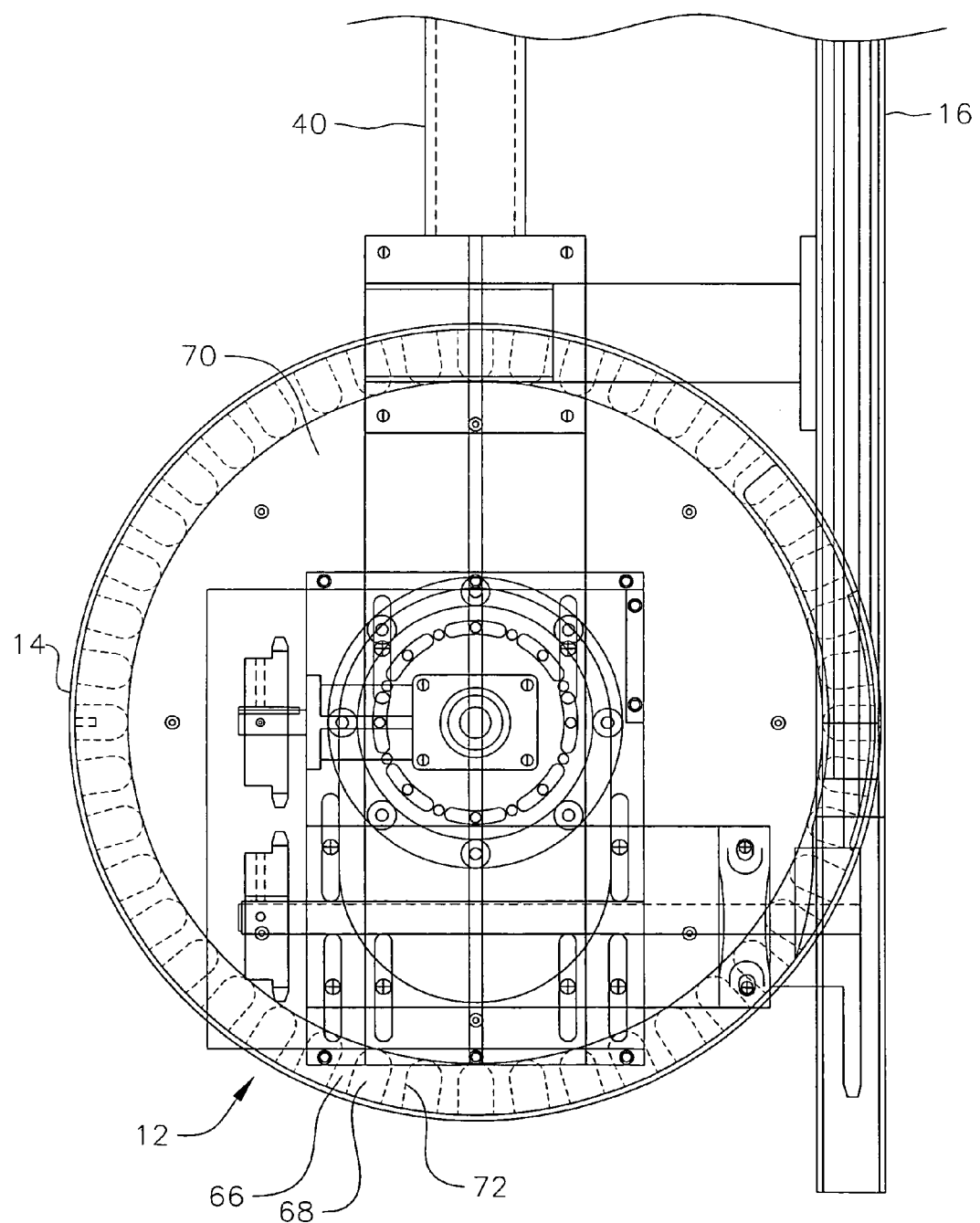
FIG. 3 is a top view of a feeder assembly of the pitting and stuffing device of FIG. 1.

As shown in FIGS. 3-5 a portion of the circular path of the dial plate 66 overlaps the conveyer chain 16. In addition, the bottom plate 68 of the feeder bowl 14 has an opening or cut-out 74 which overlaps the conveyer chain 16 (see for example FIGS. 4 and 6.) Above the bottom plate opening 74 is an overflow gate 76 (see for example FIGS. 4 and 5.) The overflow gate 76 covers the circular path of the feeder dial plate 66 in the area above the bottom plate opening 74 and the conveyer chain 16. The overflow gate 76 ensures that when each U-shaped opening 72 overlaps the bottom plate opening 74 and the conveyer chain 16, only one food item is disposed in each U-shaped opening 72. A lower end of the overflow gate may be composed of a soft material, such as rubber, so as not to damage the food items that it contacts.

Figure 7:
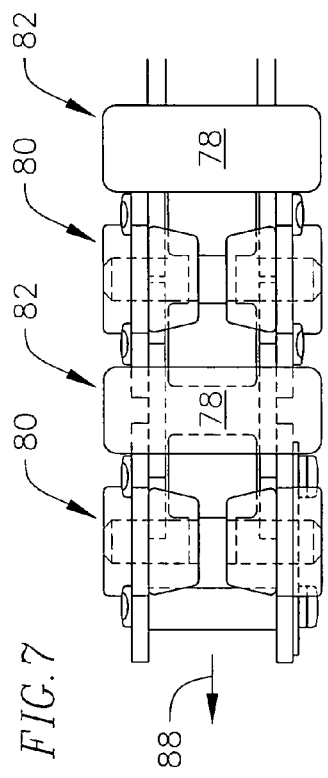
FIG. 7 is a top view of a portion of a conveyer chain of the pitting and stuffing device of FIG. 1.
Figure 8:
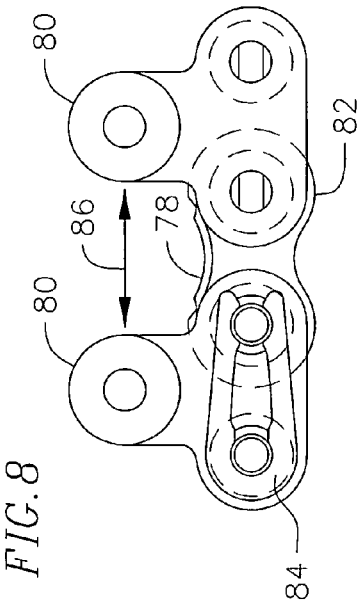
FIG. 8 is a side view of the portion of a conveyer chain of FIG. 7.
Figure 9:
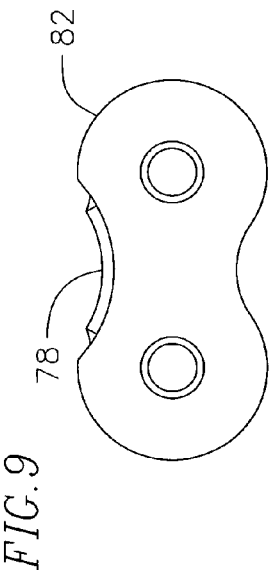
FIG. 9 is a side view of a roller link of the conveyer chain of FIG. 7.
Figure 6:
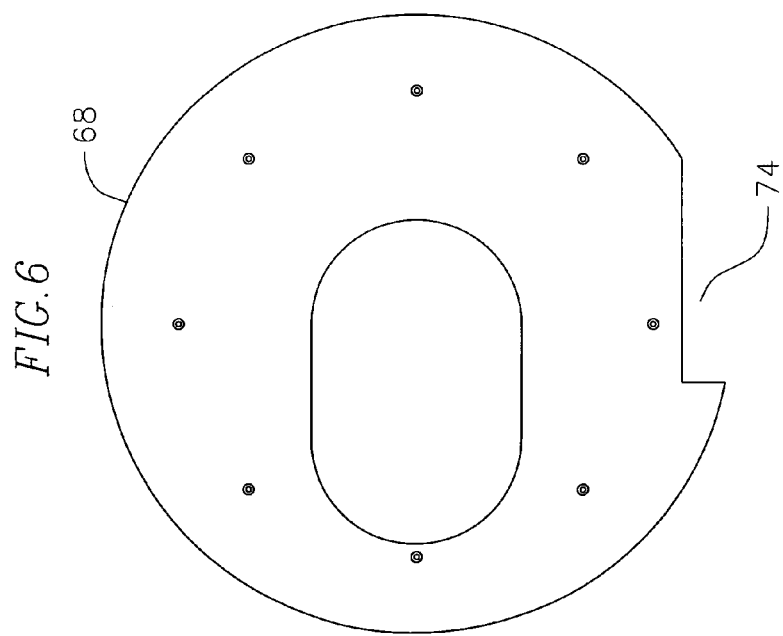
FIG. 6 is a top view of a bottom plate of the feeder assembly of FIG. 3.

When each U-shaped opening 72 is aligned directly over a corresponding receiving plate 78 (as shown in FIGS. 7-9 and described below) of the conveyer chain 16, the food item disposed therein is allowed to drop through the bottom plate 68 of the feeder bowl 14 and into the receiving plate 78 of the conveyer chain 16. In one embodiment, a mutli-legged wheel or "star wheel" is rotatably attached to a sidewall of the feeder bowl 14. The star wheel (not shown) contacts a portion of a corresponding one of the U-shaped openings 72 to rotate therewith such that a corresponding one of the legs of the star wheel rotates downwardly over the food item when it is disposed over the cut-out 74 of the bottom plate 68 to facilitate the dropping of the food item through the bottom plate 68 of the feeder bowl 14 and into the receiving plate 78 of the conveyer chain 16.

Due to the orientation of the U-shaped opening 72, when the food item (such as an olive) is received by the receiving plate 78 of the conveyer chain 16, its longitudinal axis is perpendicular to the direction of motion of the conveyer chain 16.

FIGS. 7-9 shows portions of the conveyer chain 16. In this embodiment, the conveyer chain 16 includes a series of alternatingly connected roller links 82 and connector links 80, wherein each connector link 80 is connected to an adjacent roller link 82 via a spring clip 84. Each roller link 82 includes a concave shaped receiving plate 78 mounted on an upper surface thereof, such as by a weld.

The spacing 86 between adjacent connector links 80 may vary depending on the size of the food item to be pitted and stuffed. Preferably, this spacing 86 is appropriate to allow a lateral axis of a food item to pass therebetween such that the food item is received by the receiving plate 78 of a corresponding one of the roller links 82 with the longitudinal axis of the food item being disposed perpendicular to the direction of motion 88 of the conveyer chain 16. In one exemplary embodiment, the chain is a stainless steel single strand top roller chain manufactured by Tsubaki of Canada, or its parent company Tsubakimoto Chain Company of Japan, although in other embodiments any appropriate conveyor chain for individually transporting the food items may be used.

Figure 10:
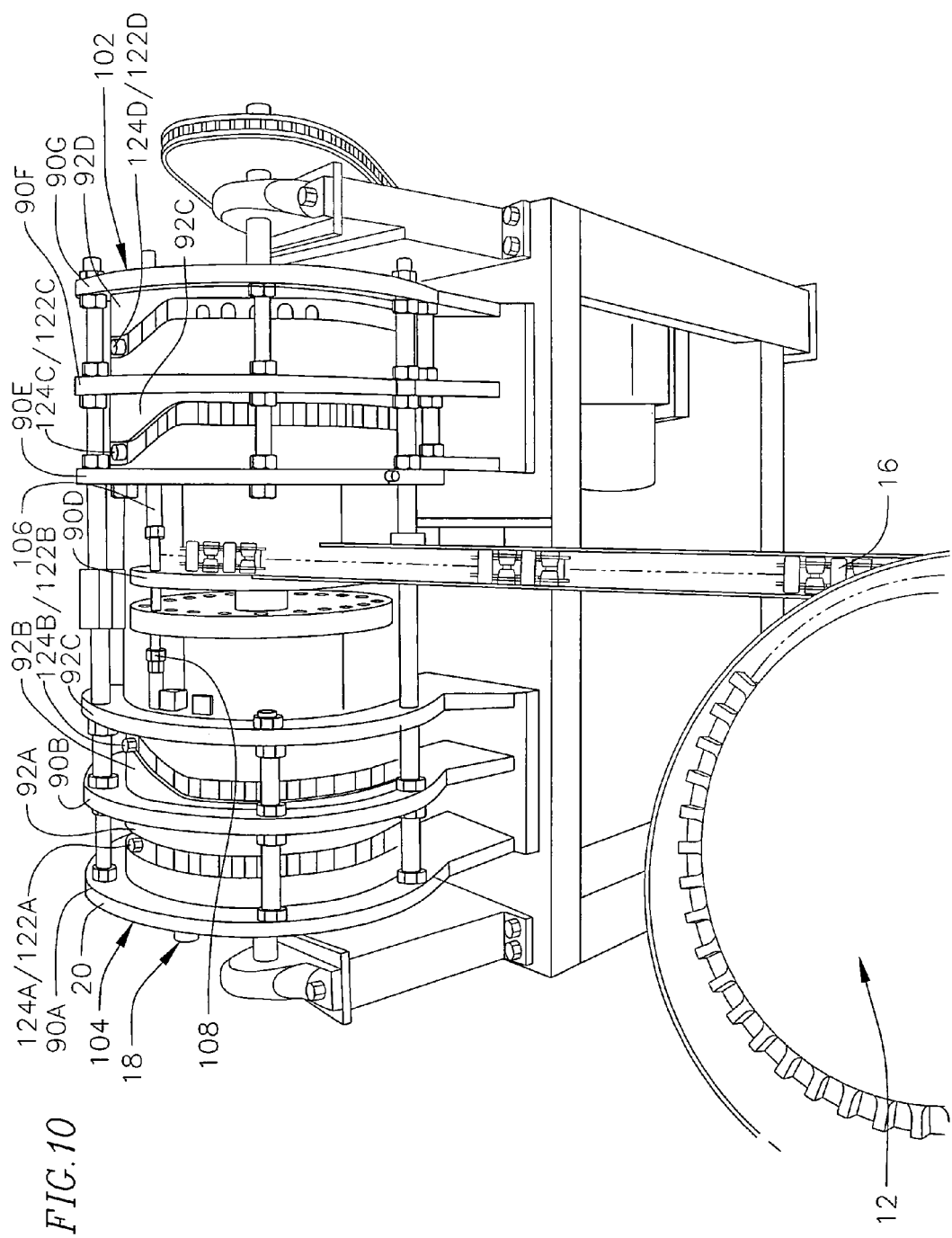
FIG. 10 is a top view of a portion of the pitting and stuffing device showing a conveyer chain connecting the feeder assembly of FIG. 3 to a pitting and stuffing assembly having a rotating drum.
Figure 11:
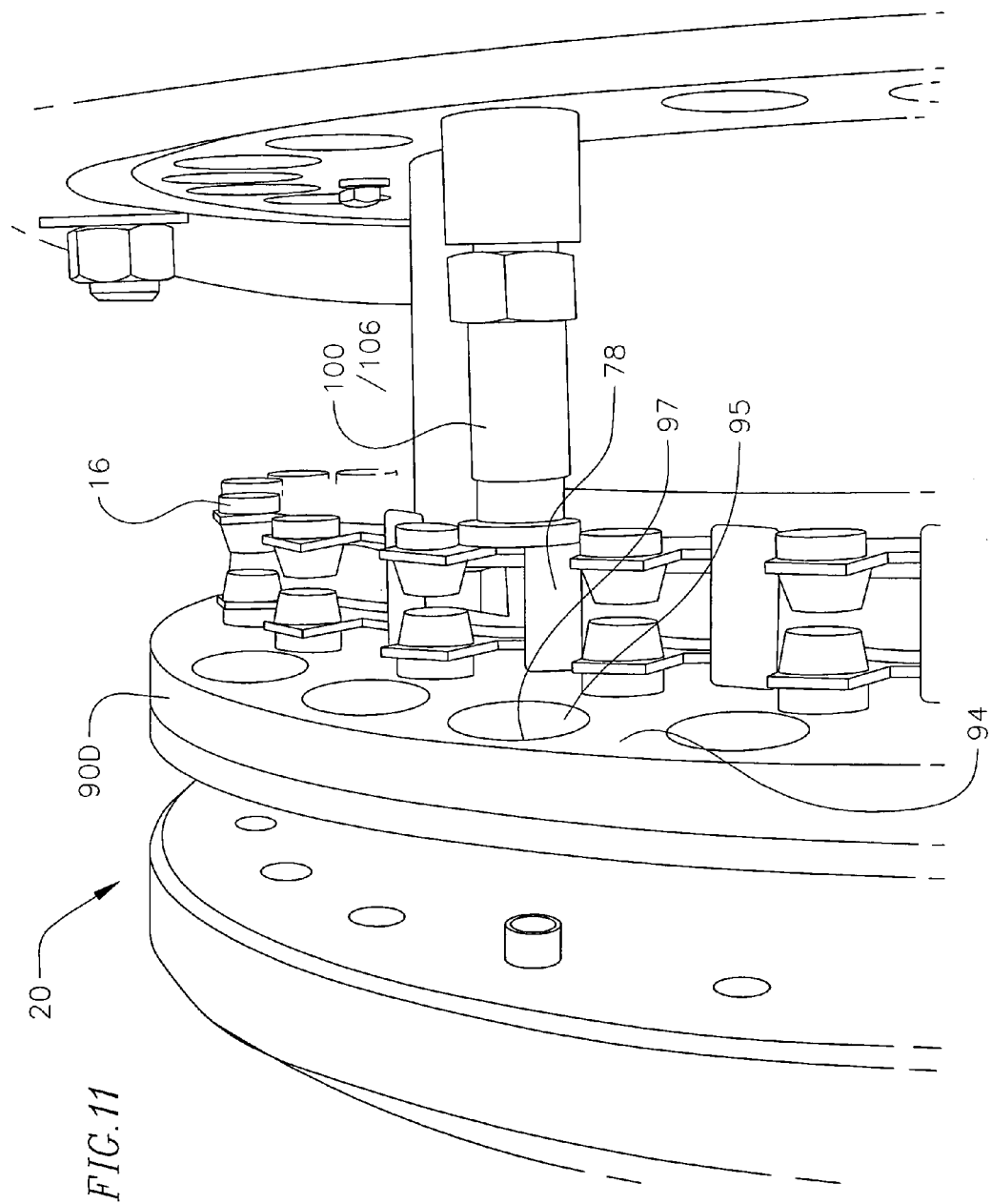
FIG. 11 is a perspective view of a conveyer chain moved in close proximity to a portion of the rotating drum of the pitting and stuffing assembly of FIG. 10.

Once the food item is received by the conveyer chain 16, the conveyer chain 16 transports the food item directly adjacent to a centering plate 90D (see for example FIGS. 10 and 11.) Although a feeder assembly 12 and conveyer chain 16 are described above, in other embodiments other means of individually transporting the food items to a position directly adjacent to the centering plate 90D may be used.

The centering plate 90D outwardly extends from the rotating drum 20 and rotates therewith. An outer periphery of the centering plate 90D includes a plurality of openings 94 (see for example FIGS. 12 and 13.) In the depicted embodiment of FIGS. 12 and 13, a centering bushing 95 is concentrically mounted within one of the centering plate openings 94 and contains an elliptically shaped opening 97, or another shaped opening appropriate for the food item being pitted. Note that for clarity purposes only one centering bushing 95 is shown in FIGS. 12 and 13, however, preferably a centering bushing 95 is concentrically mounted within a corresponding one of each of the plurality of openings 94 in the centering plate 90D.

As shown in FIG. 10, and perhaps more clearly in FIG. 11, that portion of the conveyer chain 16 that moves directly adjacent to the centering plate 90D, and specifically each receiving plate 78 of the conveyer chain 16 that moves directly adjacent with the centering plate 90D, is aligned with and moves at a same rate as a corresponding one of the centering bushings 95 in the centering plate 90D. As such, when one of the receiving plates 78 of the conveyer chain 16 carries a food item into proximity with one of the centering bushings 95, a pitting knife assembly 106 of an overall knife assembly 100 (each described in detail below) transports the food item from the conveyer chain receiving plate 78 to the elliptically shaped opening 97 in the centering bushing 95. The centering bushing 95 ensures that the food item is centered with respect to both the pitting knife assembly 106 and a stuffing knife assembly 108 (described in detail below) of the overall knife assembly 100.

For reference, in FIG. 10, the side of the rotating drum 20 to the left of the centering plate 90D may be referred to as a stuffing side 104 of the pitting and stuffing assembly 18, and the side of the rotating drum 20 to the right of the centering plate 90D may be referred to as a pitting side 102 of the pitting and stuffing assembly 18. The knife assembly 100 includes the pitting knife assembly 106 movably disposed on the pitting side 102 of the assembly 18, and the stuffing knife assembly 108 movably disposed on the stuffing side 104 of the assembly 18.

As shown in FIG. 10, the pitting and stuffing assembly 18 includes the rotating drum 20 having the centering plate 90D attached thereto. As shown, a plurality of stuffing knife plates 90A-90C, as well as a plurality of pitting knife plates 90E-90G, outwardly extend from and rotate with the rotating drum 20. The stuffing knife and pitting knife plates 90A-90C and 90E-90G are each substantially similar to the centering plate 90D (shown for example in FIGS. 12 and 13), and each have openings corresponding to, and axial aligned with, a corresponding one of each of the plurality of openings 94 in the centering plate 90D.

As shown in FIG. 10, the stuffing knife assembly 108 is disposed in a corresponding set of axially aligned openings in the stuffing knife plates 90A-90C and is moveable relative thereto in order to contact and manipulate a food item held within a corresponding one of the centering bushings 95 of the centering plate 90D from the stuffing side 104 of the assembly 18.

Similarly, the pitting knife assembly 108 is disposed in a corresponding set of axially aligned openings in the pitting knife plates 90E-90G and moveable relative thereto in order to contact and manipulate a food item held within a corresponding one of the centering bushings 95 of the centering plate 90D from the pitting side 102 of the assembly 18. Note that for clarity purposes only one knife assembly 100 is shown in FIGS. 10 and 11, however, preferably a knife assembly 100 including the stuffing knife assembly 108 and the pitting knife assembly 106 is disposed in each aligned set of openings in the drum plates 90A-90C and 90E-90G. For example, one embodiment of the pitting and stuffing assembly 18 includes twenty two knife assemblies 100 all worked at the same time.

As shown in FIG. 10, the drum 20 also includes a plurality of cam plates 92A-92D, which do not rotate with the drum 20. The stuffing knife assembly 108 rides within and is movable by the cam plates 92A and 92B. Similarly the pitting knife assembly 106 rides within and is movable by the cam plates 92C and 92D. As described in detail below, the cam plates 92A-92D cause the relative motion of the pitting knife assembly 106 and the stuffing knife assembly 108 relative to the drum plates 90A-90G, which allows the knife assemblies 106 and 108 to contact and manipulate a food item held within the centering bushing 95 of the centering plate 90D.

Figure 14:
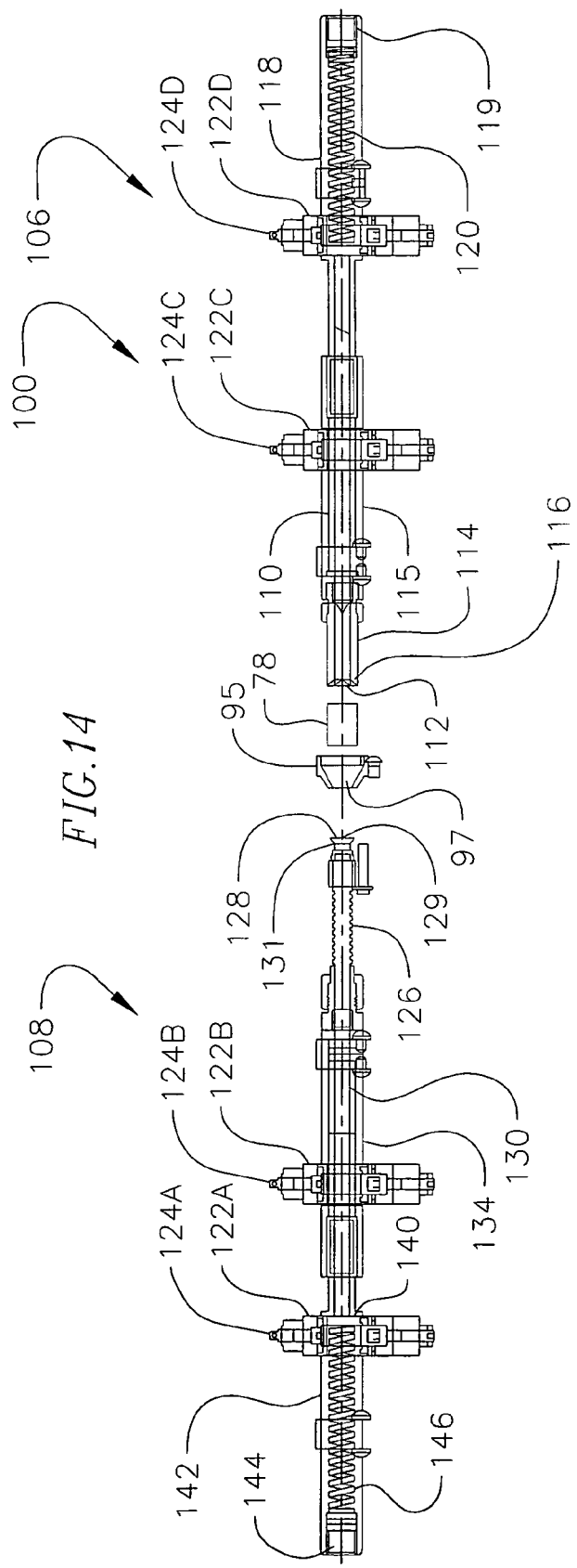
FIG. 14 shows a side view of a knife assembly disassembled from the rotating drum of the pitting and stuffing assembly of FIG. 10.

FIG. 14 shows the knife assembly 100 (including the pitting knife assembly 106 and the stuffing knife assembly 108) as well as a corresponding one of the centering bushings 95 detached from the rotating drum 20. Also shown adjacent to the centering bushing 95 is a receiving plate 78 detached from the conveyer chain 16.

Figure 15:
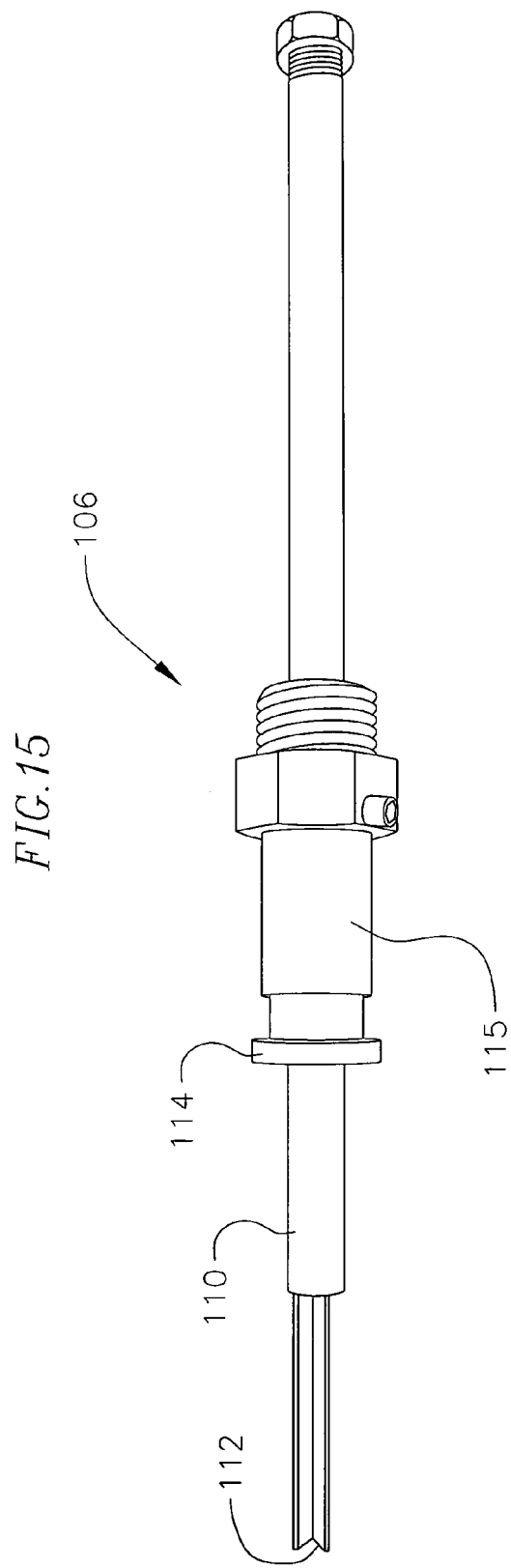
FIG. 15 shows a side view of a pitting knife assembly disassembled from the rotating drum of the pitting and stuffing assembly of FIG. 10.
Figure 16:
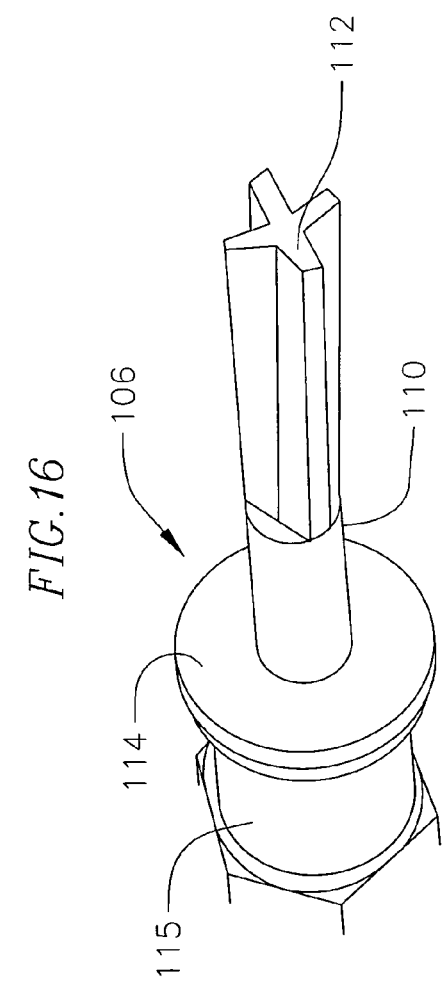
FIG. 16 shows a perspective view of the pitting knife assembly of FIG. 15.

As shown in FIGS. 14-16, the pitting knife assembly 106 includes a pitting knife 110 having a cross-haired or X-shaped blade 112 (as shown for example in FIG. 16.) The pitting knife 38 serves to pierce an outer surface of the food item; traverse within the food item until a pit of the food item is met; and continue to traverse the food item until the pit has been ejected from the food item (as discuss in detail below.) Although an X-shaped blade is shown, the pitting knife blade 112 may be of any shape and size appropriate for piercing the surface of the food item and driving the pit out of the food item.

A guide sleeve 114 is disposed in surrounding relation to and movable relative to the pitting knife 110. In fact, the guide sleeve 114 may move past the pitting knife blade 112 to allow a tapered end 116 of the guide sleeve 114 to receive and center the food item relative to the pitting knife blade 112 before the blade 112 contacts the food item. The tapered end 116 of the guide sleeve 114 may be elliptically shaped or any other shape suitable for receiving an end of the food item to be pitted. The guide sleeve 114 is received within a guide sleeve housing 115. Within the guide sleeve housing is a biasing means, such as a spring, for biasing the guide sleeve toward the food item. The pitting knife 110 also extends within an open lumen in the guide sleeve housing 115.

As shown in FIG. 14, an end 117 of the pitting knife 110 opposite from the pitting knife blade 112 extends into a pitting knife housing 118. The housing 118 includes a set screw 119 which receives a spring 120. The end 117 of the pitting knife 110 extends into the pitting knife housing 118 and abuts the spring 120, biasing the pitting knife 110 toward the food item.

As shown in FIG. 14, attached to an outer surface of the guide sleeve housing 115 is a cam follower 122C having a bearing 124C which rides within the cam plate 92C (see FIG. 10) to move the guide sleeve 114 toward or away from the food item. Similarly, attached to an outer surface of the pitting knife housing 118 is a cam follower 122D having a bearing 124D which rides within the cam plate 92D (see FIG. 10) to move the pitting knife blade 112 toward or away from the food item.

Figure 17:
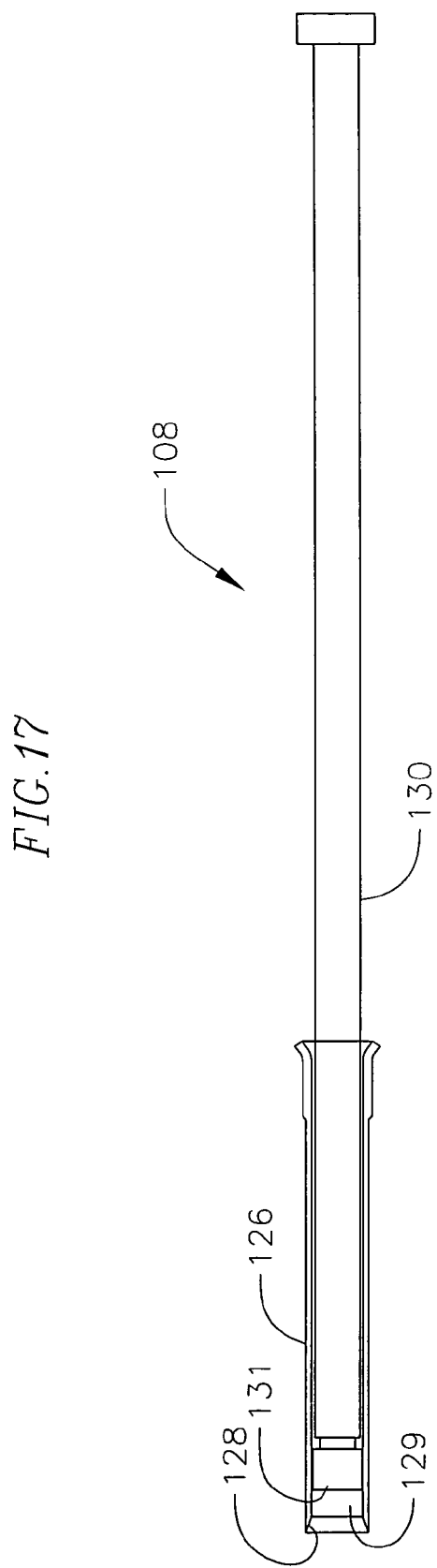
FIG. 17 shows a side view of a stuffing knife assembly disassembled from the rotating drum of the pitting and stuffing assembly of FIG. 10.

As shown in FIGS. 14 and 17, the stuffing knife assembly 108 includes a stuffing knife 126 having a circular blade 128 with a hollow interior 129. The stuffing knife 126 serves to pierce or penetrate the pit of a food item so that the pit will follow the stuffing knife 126 out of the food item (with the help of the pitting knife 110.) The hollow interior 129 of the stuffing knife 126 serves to receive a stuffing product from the stuffing manifold and transport the received stuffing product into the pitted food item (discuss in detail below.)

The stuffing knife 126 is also disposed in surrounding relation to a piston 130, which serves to remove the food item pit from the stuffing knife blade 128 after the pit has been removed from the food item, and also serves to push the stuffing product out of the hollow interior 129 of the stuffing knife 126 and into the pitted food item (discussed in detail below.) Preferably the piston has a flat head 131.

As shown in FIG. 14, a stuffing knife holder 136 holds an end of the stuffing knife 126 and is further connected (such as by threads) to a connector tube 136 that connects to a stuffing knife holder housing 134.

The piston 130 extends through a lumen in the stuffing knife holder housing 134 and has an end 140 that extends into a piston housing 142. The piston housing 142 includes a set screw 144, which receives a spring 146. The end 140 of the piston 130 extends into the piston housing 142 and abuts the spring 146, biasing the piston 130 toward the food item.

As shown in FIG. 14, attached to an outer surface of the stuffing knife holder housing 134 is a cam follower 122B having a bearing 124B which rides within the cam plate 92B (see FIG. 10) to move the stuffing knife 126 toward or away from the food item. Similarly, attached to an outer surface of the piston housing 124 is a cam follower 122A having a bearing 124A which rides within the cam plate 92A (see FIG. 10) to move the piston 130 toward or away from the food item. As such, each of the piston 130, the pitting knife 110 and the pitting knife guide sleeve 114 are spring biased toward the food item. The pitting knife guide sleeve 114 is spring biased to allow for variations in the size of the food item being held between the centering bushing 95 and the guide sleeve 114. Similarly, the shape, angles, sizes and similar characteristics of each knife assembly including cam followers, bearings, cam plates and other components may be altered depending on the size and shape of the food item being processed.

Referring back to FIG. 1, the stuffing manifold 22 is disposed in close relation to a portion of the circular path of the stuffing knife 126 (not shown in FIG. 1.) The stuffing manifold 22 is connected to the stuffing tank 24 which holds a large quantity of stuffing product. The stuffing tank 24 may be any tank adapted to hold an appropriate amount of stuffing product and adapted to allow the stuffing product to be pumped therefrom. In an exemplary embodiment, the stuffing tank 24 is cylindrical, having an open upper end through which new stuffing product may be added; and a conically-shaped basin with an opening 180 through which the stuffing product is pumped. The stuffing tank 24 is connected to the stuffing pump 26 via a link 182. The stuffing pump 26, such as a positive displacement pump, continuously feeds stuffing product from the stuffing tank 24 to the stuffing manifold 22 via the link 182 and another link 184, which connects the pump 26 to the stuffing manifold 22. The stuffing manifold 22 is adjacent to an arc of the circular path of the stuffing knife 126 to provide the stuffing knife 126 with stuffing product to be stuffed into the food item. A return tube 186 re-circulates stuffing product from the stuffing manifold 22 to the stuffing tank 24. As such the stuffing product is continuously moved as shown by the arrows in FIG. 1.

Figure 18:
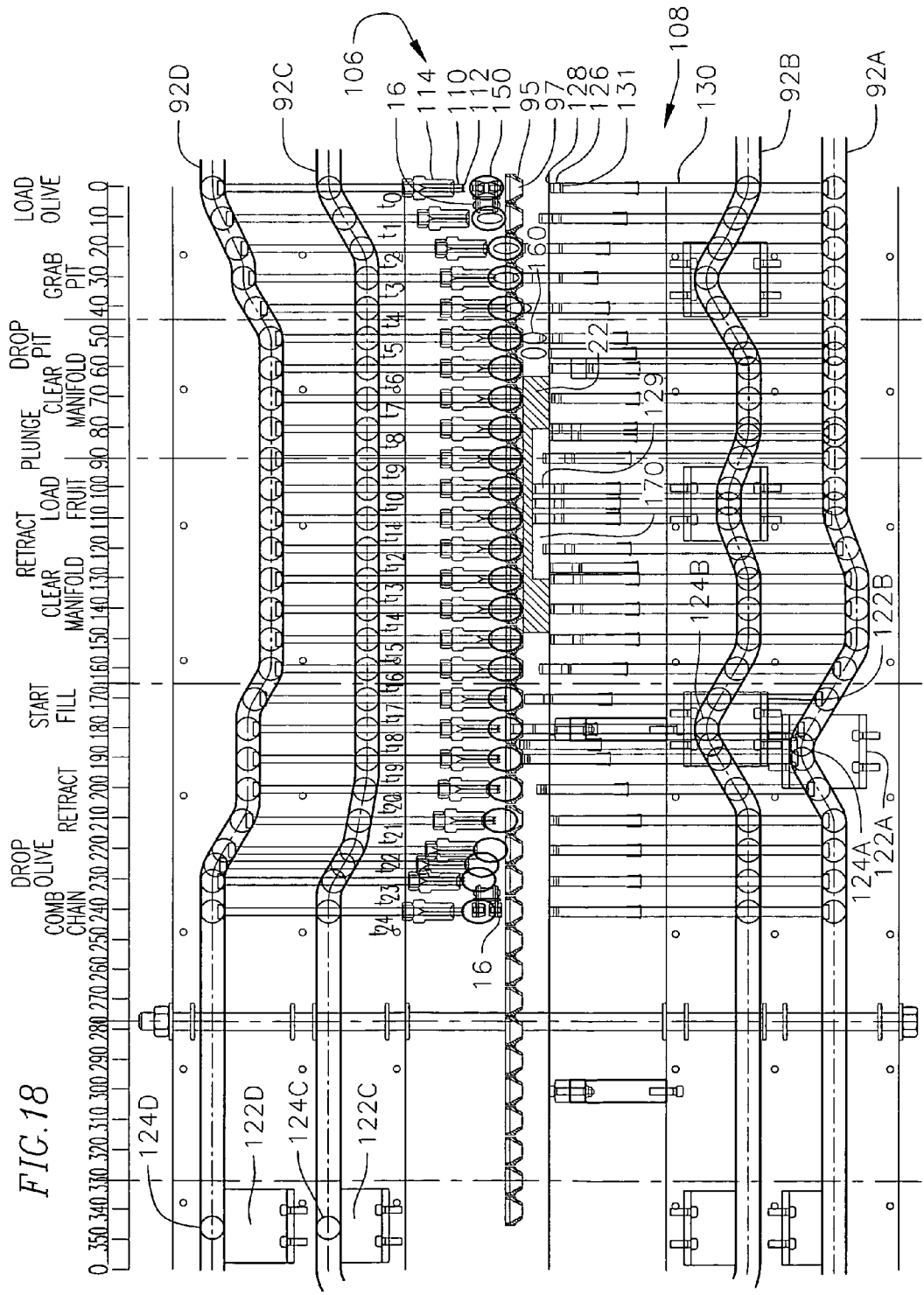
FIG. 18 shows a timing diagram of the pitting knife assembly and the stuffing knife assembly during a complete pitting and stuffing cycle of a food item.

In order to further describe the features of the pitting and stuffing device 10, an example of a typical pitting and stuffing cycle using an olive 150, having a pit 160, is described with reference to a timing diagram of FIG. 18. The timing diagram as shown in FIG. 18 shows the sequence of actions of the pitting knife 110, the pitting knife guide sleeve 114, the stuffing knife 126, and the stuffing knife piston 130. Note that the cam plates 92A-92D, which are actually circular plates have been linearly drawn in FIG. 18, with 0 to 360 degree denotations signifying that the cam plates 92A-92D are indeed circular plates and not linear plates.

During a typical pitting and stuffing cycle, the knife assembly 100 is operated by the cams plates 92A-92D. That is, a pitting knife cam plate 92D controls the movement of the pitting knife 110; the guide sleeve cam plate 92C controls the movement of the guide sleeve 114; the stuffing knife cam plate 92B controls the movement of the stuffing knife 126; and the piston cam plate 92A controls the movement of the piston 130.

As shown in FIG. 18, degree markings 0 to 360 denote the angle of rotation of the rotating drum 20. On the timing diagram of FIG. 18 0 degrees represents the point at which a corresponding one of the receiving plates 78 (hidden by the olive 150 in FIG. 18) of the conveyer chain 16 first aligns with a corresponding one of the centering bushings 95. From an initial time t0 to a time t2 the pitting knife assembly 106 moves toward and contacts the olive 150 transporting it from the conveyer chain 16 to a corresponding one of the centering bushings 95. During the same time span the stuffing knife 126 moves into a position directly adjacent to the olive 150. At the time t2, the stuffing knife 126, the pitting knife 110, and the guide sleeve 114 are each positioned directly adjacent to the olive 150.

From the time t2 to a time t3, the tapered end 116 of the guide sleeve 114 moves into full contact with the olive 150, such that the olive 150 is firmly held between the elliptically shaped opening 97 of the centering bushing 95 and the tapered end 116 of the guide sleeve 114. As such, the centering bushing 95 serves to center the olive 150 with respect to the stuffing knife 126, and the guide sleeve 114 serves to center the olive 150 with respect to the pitting knife 110. Also during this time span, the circular blade 128 of the stuffing knife 126 pierces an outer surface of the olive 150, while the blade 112 of the pitting knife 110 pierces an outer surface of the olive 150 on an opposite end thereof. The blades 128 and 112 of the stuffing knife 126 and the pitting knife 110, respectively, each continue to traverse the olive 150 to contact the pit 160 (again at opposite ends thereof.)

The circular blade 128 of the stuffing knife 126 penetrates or pierces into the pit 160 of the olive 150, causing the pit 160 to "stick" to the circular blade 128 of the stuffing knife 126, while the blade 112 of the pitting knife 110 pushes the pit 160 toward the stuffing knife 126 urging the stuffing knife 126 to penetrate the pit 160.

Note that from time t3 to time t20, the guide sleeve 114 remains in the same position, so that in combination with the centering bushing 95, the olive 150 is firmly held in a centered position with respect to both the pitting knife 110 and the stuffing knife 126 during an entire pitting and stuffing cycle. This allows the olive 150 to remain in a fixed orientation or registration during both the pitting and the stuffing operations, such that the same cavity created during the pitting operation is stuffed during the stuffing operation, with no misalignment of the cavity between the pitting and stuffing operations.

From the time t3 to a time t5, the stuffing knife 126 reverses directions to pull the pit 160 out of the olive 150, while the pitting knife 110 continues to traverse the olive 150 until the pit 160 is completely ejected therefrom to create a cavity into which the stuffing product is later inserted.

At time t5, the pit 160 might be stuck onto the end of the circular blade 128 of the stuffing knife 126. Therefore, from the time t5 to a time t6, the circular blade 128 of the stuffing knife 126 moves to a position substantially flush with the head 131 of the piston 130 to disengage the pit 160 from the circular blade 128 of the stuffing knife 126, allowing the pit 160 to fall therefrom and into a pit container (not shown.)

Figure 20:
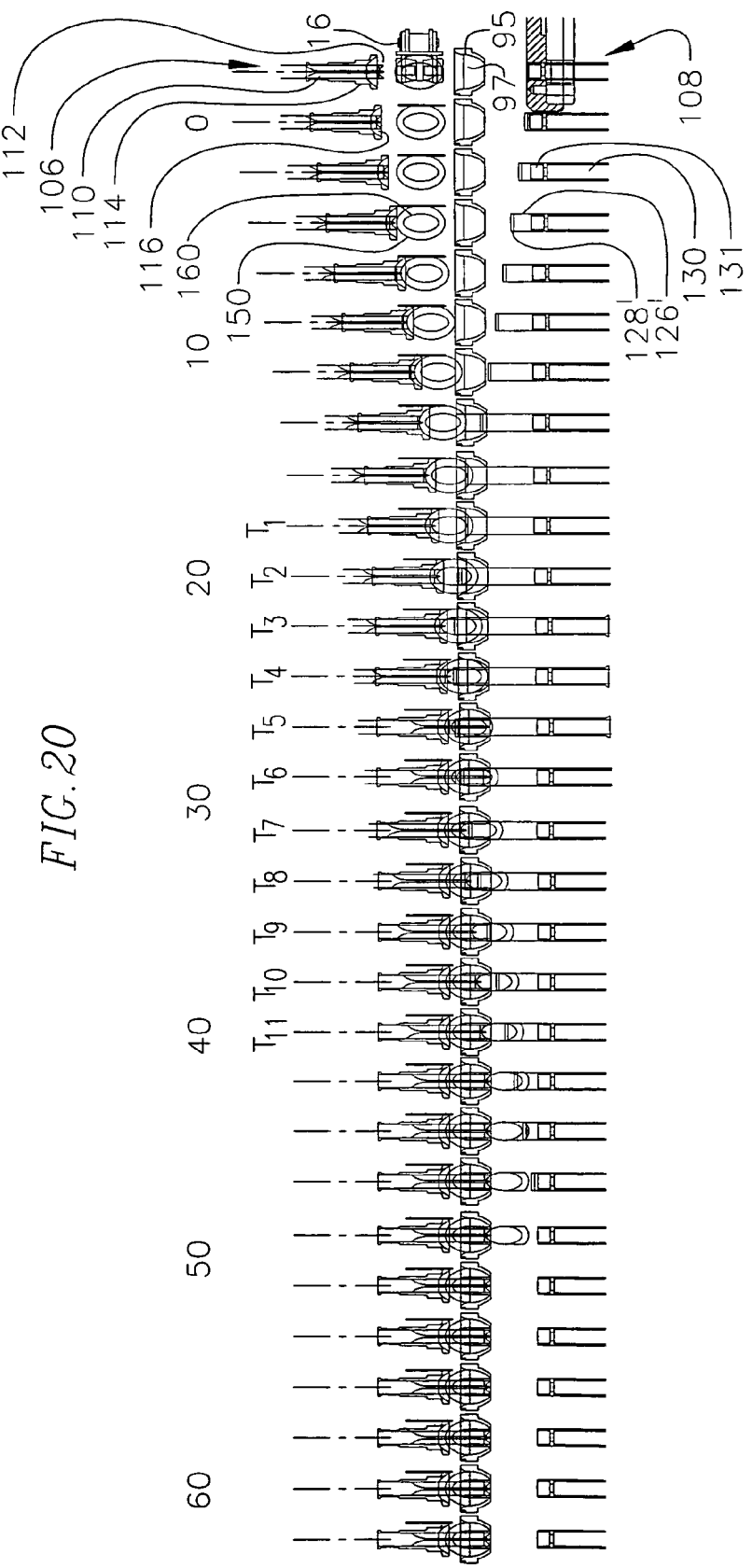
FIG. 20 shows a portion of an alternative timing diagram of the pitting knife assembly and the stuffing knife assembly during an alternative pitting operation.

An alternative method for pitting the food item, in this case the olive 150, is shown in the timing diagram of FIG. 20 (showing only the portion of the operation from the 0 degree to the 60 degree positions of the cam plates 92A-92D, although the cam plates 92A-92D have been omitted for clarity.) This embodiment is substantially the same as that described above with a difference being that in this embodiment the circular blade 128' of the stuffing knife 126' is larger in diameter than a typical olive pit 160.

This allows the circular blade 128' of the stuffing knife 126' to pierce through the olive 150, and around the pit 160 as shown from a time T1 to a time T5, such that at the time T5, an end of the circular blade 128' of the stuffing knife 126' is in a position adjacent with an end of the blade 112 of the pitting knife 110. This facilitates removal of the pit 160 of the olive 150 since the meat of the olive 150 adjacent to the pit 160 is cut through by the circular blade 128' of the stuffing knife 126'.

From the time T5 to a time T11, the blade 112 of the pitting knife 110 completely traverses the olive 150 until the pit 160 is completely ejected therefrom, and the circular blade 128' of the stuffing knife 126' is completely removed form the olive 150 to create a cavity into which the stuffing product is later inserted. From this point the process is the same as that shown in FIG. 18.

As such, returning to FIG. 18, from the time t5 to a time t16, the pitting knife 110 remains in a position with the blade 112 of the pitting knife 110 traversing the entire length of the olive 150. Similarly, from the time t6 to a time t8, the stuffing knife 126 maintains the same position. Note that the extension of the blade 112 of the pitting knife 110 across the length of the olive 150 from the time t5 to the time t16 helps to maintain the cavity of the olive 150 created during the pitting operation in the same orientation during the stuffing operation.

Figure 19:
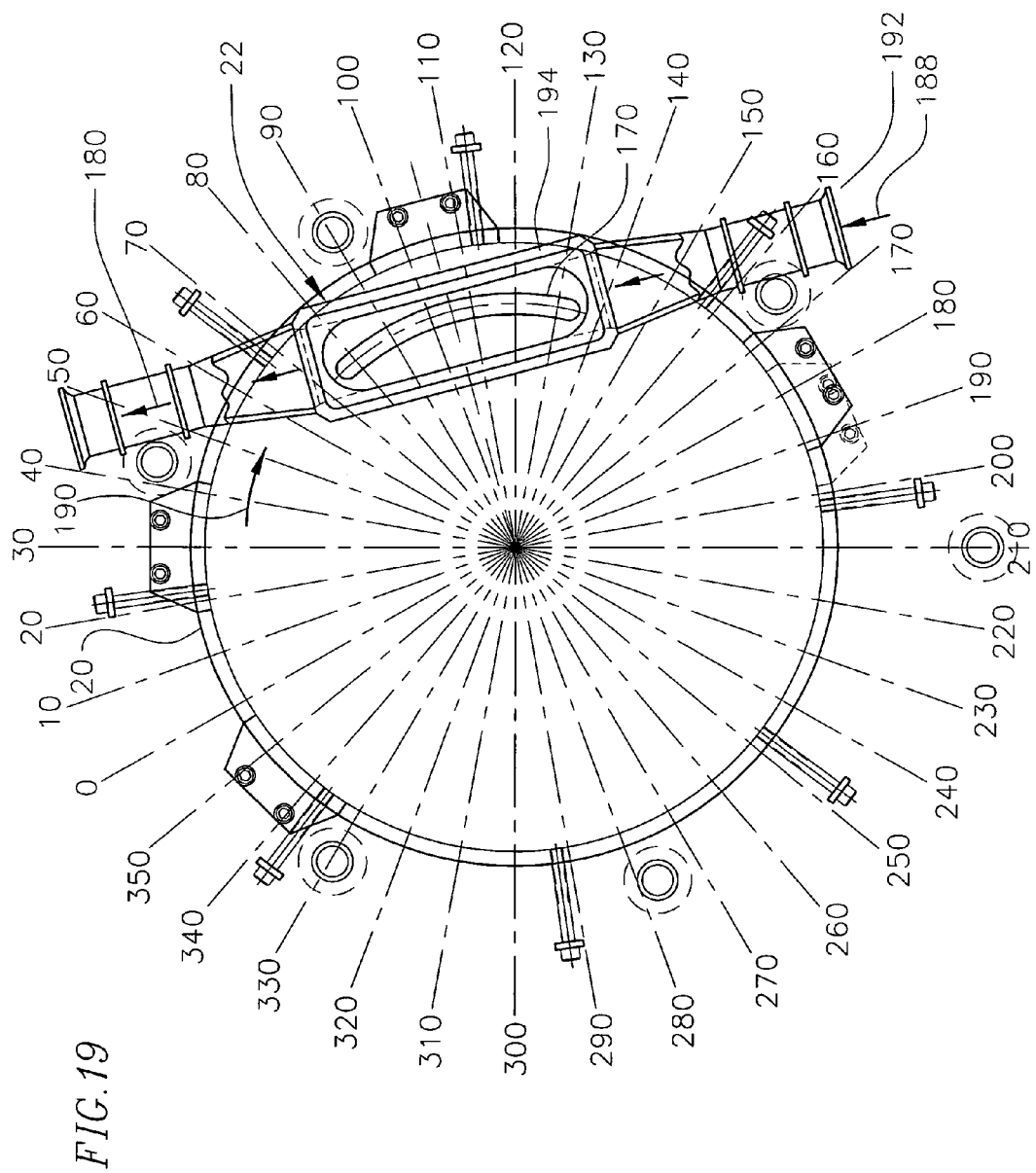
FIG. 19 shows a side view of a stuffing manifold adjacent to the rotating drum of FIG. 10.

As shown in FIGS. 18 and 19, the stuffing manifold 22 is disposed adjacent to an arc of the circular pathway of the stuffing knife 126. As shown in FIG. 19, stuffing product enters the stuffing manifold 22 through a lower opening 192 and passing through an area 194 having a cavity 170 that faces the rotating drum 20, and specifically the pathway of the stuffing knife (not shown.) Note that the rotation of the drum 20 as shown by arrow 190 is opposite from the pumping direction of the stuffing product as shown by arrow 192 this facilitates a loading of the stuffing product into the circular blade 128 of the stuffing knife 126 as described below.

Referring now again to the timing diagram of FIG. 18, at a time t9, the stuffing knife 126 moves into the stuffing manifold cavity 170 to pierce through the stuffing product to volumetrically receive a predetermined amount of the stuffing product from the stuffing manifold 22. In one embodiment, the stuffing product includes pimentos, such as diced pimentos. At a time t10, the hollow interior 129 of the circular blade 128 of the stuffing knife 126 extends into the stuffing product of the stuffing manifold 22. At times t11 and t12, the stuffing knife 126 moves away from the stuffing manifold cavity 170, taking with it the predetermined volumetric amount of stuffing product that has been loaded in to the hollow interior 129 of the circular blade 128 of the stuffing knife 126. At a time t13, the stuffing knife 126 is completely withdrawn from the stuffing manifold cavity 170.

From the time t13 to a time t17 the stuffing knife 126 transports the stuffing product that has been loaded therein and brings it adjacent to the olive 150. At time t17, the pitting knife 110 begins to withdraw from the pitted olive 150 to allow the stuffing product from the stuffing knife 126 to be inserted in the cavity created during the pitting operation. From the time t17 to a time t19 the piston 130 moves toward the cavity of the olive 150 forcing the stuffing product from the stuffing knife 126 and into the cavity of the olive 150. At the time t19, the head 131 of the piston 130 is substantially flush with the end of the stuffing knife 126 allowing all of the stuffing product from the stuffing knife 126 to be pushed into the cavity of the olive 150.

From the time t19 to a time t21, the pitting knife 110 remains inserted into the now pitted and stuffed olive 150 while the stuffing knife 126 and the piston 130 move away from the olive. From the time t21 to a time t22, the pitting knife 110 transports the olive 150 to a position exterior from the centering bushing 95. From the time t22 to a time t24 the pitting knife 110 withdraws from the olive 150 while the guide sleeve 114 remains in contact therewith enabling the olive 150 to fall from the pitting knife 110 and into an olive container (not shown.)

The preceding description has been presented with reference to various embodiments of the invention. Although the above description focuses on pitting and stuffing olives, the described pitting and stuffing device may be used to pit stuff other food items as well. Persons skilled in the art and technology to which this invention pertains will appreciate that alterations and changes in the described structures and methods of operation can be practiced without meaningfully departing from the principle, spirit and scope of this invention.

What is claimed is:

1. A food processing apparatus comprising:
   a first knife assembly comprising a first knife configured to cut a portion of a first food item from a first food side; and
   a second knife assembly comprising a second knife configured to cut the first food item from a second side opposite the first side and to push the cut portion of the first food item toward the first knife assembly and remove the cut portion from the first food item to create cavity in the first food item wherein the first knife assembly is configured to insert a second food item into the cavity of the first food item through the first knife.

2. The apparatus of claim 1, wherein the second knife assembly further comprises a guide sleeve for capturing the first food item against an orienting bushing.

3. The apparatus of claim 1, wherein the second food item is in a pumpable form, and the apparatus further comprises a delivery assembly for pumping the second food item through a manifold to be received by the first knife for insertion into the cavity of the first food item.

4. The apparatus of claim 1, wherein the first knife assembly comprises:
   a piston configured to press the second food item into the cavity of the first food item.

5. The apparatus of claim 1, wherein the first knife comprises:
   a hollow knife configured to receive the cut portion of the first food item and extract the cut portion from the first food item and to insert the second food item into the cavity of the first food item.

6. The apparatus of claim 1, wherein at least one of the first and second knife assemblies comprises a biasing member configured to bias the at least one of the first and second knife assemblies toward the first food item.

7. The apparatus of claim 1, wherein the first knife assembly is configured to substantially fill the cavity of the first food item with the second food item.

8. The apparatus of claim 2, further comprising a piston configured to press the second food item into the cavity of the first food item, and a plurality of cams configured to control a sequence of movements of the first knife, the second knife, the guide sleeve, and the piston relative to one another, the plurality of cams including a first cam coupled to the first knife for controlling movement of the first knife, a second cam coupled to the second knife for controlling movement of the second knife, a third cam coupled to the guide sleeve for controlling movement of the guide sleeve, and a fourth cam coupled to the piston for controlling movement of the piston.

9. The apparatus of claim 1, wherein the first and second knives face each other and have a substantially same longitudinal axis.

10. An apparatus comprising:
    a first cutting means for cutting and defining a space in a first food item and for stuffing a second food item into the space in the first food item; and
    a second cutting means for cutting the first food item and pushing a cut portion of the first food item out of the first food item to create the space in the first food item.

11. The apparatus of claim 10, further comprising:
    a pumping means for supplying the second food item to the first cutting means.

12. The apparatus of claim 10, further comprising:
    a conveyance means for providing the first food item to the first cutting means and the second cutting means.

13. The apparatus of claim 10, further comprising:
    a holding means for holding the first food item during stuffing.

14. A food processing apparatus comprising a dual knife assembly, the dual knife assembly comprising:
    a first knife assembly including a first knife and a guide sleeve around the first knife, the first knife having a longitudinal axis; and
    a second knife assembly including a second knife and a piston within the second knife, the second knife facing the first knife and having a longitudinal axis substantially the same as the longitudinal axis of the first knife,
    wherein the dual knife assembly is configured to cut a first food item at a first end, remove a core of the first food item through a second end opposite the first end to define a cavity in the first food item, and insert a second food item into the cavity through the second end via the second knife.

15. The apparatus of claim 14, wherein the first knife comprises a knife blade having an X-shaped cross-sectional area.

16. The apparatus of claim 14, wherein the second knife comprises a circular knife blade having a hollow interior for receiving the second food item.

17. The apparatus of claim 14, further comprising a plurality of cams including a first cam coupled to the first knife for controlling movement of the first knife, a second cam coupled to the second knife for controlling movement of the second knife, a third cam coupled to the guide sleeve for controlling movement of the guide sleeve, and a fourth cam coupled to the piston for controlling movement of the piston.

18. The apparatus of claim 17, wherein the plurality of cams is configured to control a sequence of movements of the first knife, the second knife, the guide sleeve, and the piston relative to one another.

19. The apparatus of claim 18, wherein the third cam is configured to move the guide sleeve toward the first food item at a first time to hold the first food item stationary, the first cam is configured to move the first knife toward the first food item at a second time subsequent to the first time to cut the first food item and push the core toward the second knife, the second cam is configured to move the second knife toward the first food item at a third time to cut the first food item from a side opposite the first knife, and the second cam is further configured to move the second knife away from the first food item at a fourth time subsequent to the second and third times to remove the core from the first food item.

20. The apparatus of claim 19, wherein the second cam is further configured to move the second knife toward the first food item and the fourth cam is configured to move the piston toward the first food item subsequent to the fourth time to insert the second food item into the cavity of the first food item.

\* \* \* \* \*

UNITED STATES PATENT AND TRADEMARK OFFICE
CERTIFICATE OF CORRECTION

| | |
|---|---|
| PATENT NO. | : 7,779,752 B1 |
| APPLICATION NO. | : 11/321359 |
| DATED | : August 24, 2010 |
| INVENTOR(S) | : Thomas E. Ellison |

It is certified that error appears in the above-identified patent and that said Letters Patent is hereby corrected as shown below:

In the Claims

Column 11, Claim 1, line 38    After "create" Insert -- a --

Signed and Sealed this
Twenty-sixth Day of April, 2011

David J. Kappos
*Director of the United States Patent and Trademark Office*